No. 740,381. PATENTED SEPT. 29, 1903.
E. W. HASENPFLUG.
FILTER.
APPLICATION FILED JULY 2, 1902.
NO MODEL.
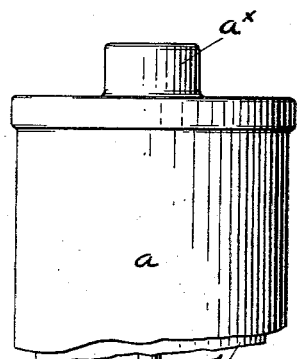
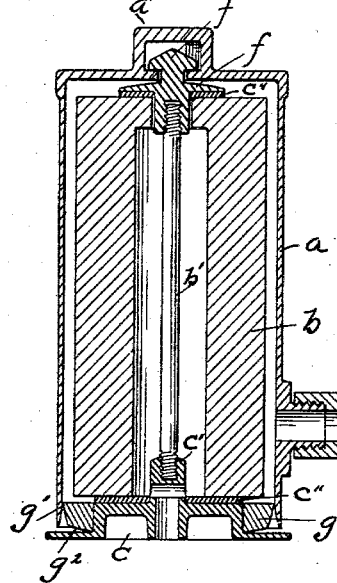
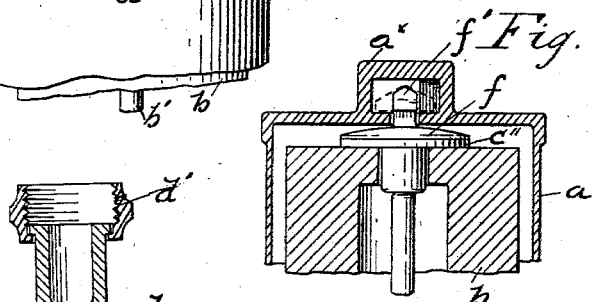
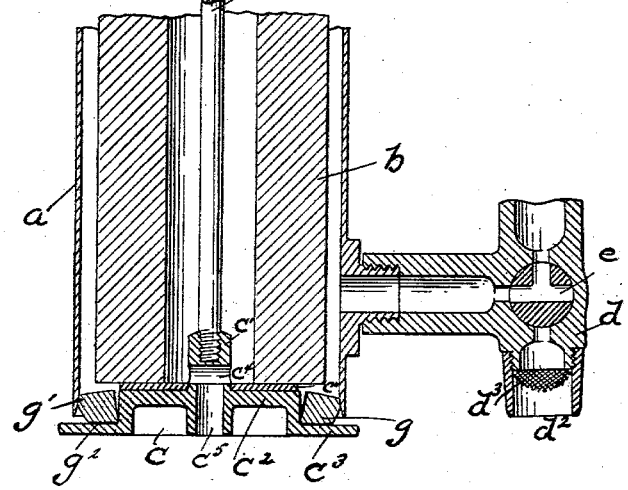
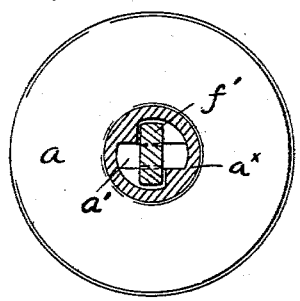
Witnesses:
A. L. Lord
Charles S. Beardsley
Inventor:
EZRA W. HASENPFLUG.
By Albert Lynn Lawrence
Attorney.

No. 740,381. Patented September 29, 1903.

UNITED STATES PATENT OFFICE.

EZRA W. HASENPFLUG, OF EAST CLEVELAND, OHIO, ASSIGNOR TO THE CHAMPION SAFETY LOCK COMPANY, OF GENEVA, OHIO, A CORPORATION OF OHIO.

FILTER.

SPECIFICATION forming part of Letters Patent No. 740,381, dated September 29, 1903.

Application filed July 2, 1902. Serial No. 114,081. (No model.)

*To all whom it may concern:*

Be it known that I, EZRA W. HASENPFLUG, a citizen of the United States of America, and a resident of East Cleveland, in the county of Cuyahoga and State of Ohio, have invented certain new and useful Improvements in Filters, (Case No. 1,) of which the following is a specification, reference being had to the accompanying sheet of drawings, forming a part thereof.

My invention relates to improvements in filters, and has for its object the provision in this class of apparatus of a readily-separable and highly-efficient fluid-tight joint and mounting for the principal parts thereof, at the same time materially reducing the cost of manufacture, simplifying the arrangement of the filter parts, and obtaining a novel and distinctly-advantageous controllable connection with the supply-pipe.

In order to secure good results from filters, it is well known that the filtering medium must be maintained in a clean and porous condition, which involves more or less frequent attention to said filtering medium. The majority of filters are so constructed or arranged that the filtering medium may be withdrawn from the filter-chamber in order that the former may be cleansed, the connection or joint therebetween being made fluid-tight by a compressible packing clamped between two otherwise abutting surfaces by means of screw-pressure. Although this arrangement embodied in various types of apparatus is initially entirely efficient, it is coupled with the disadvantages of being unhandy, in that the screw-tightened joint requires considerable time and attention each time the filter is opened and closed. The threads are worn and stripped in effecting sufficiently tight closures and not infrequently become so firmly seated as to require such force to start the joint as is likely to damage the filter. In most instances it is desirable that an ample and unfiltered supply of water be available at the same point that the filter is located, involving the use of an additional supply pipe or tap. To the correction of these disadvantages my present improvements are principally directed, the same being herein illustrated as embodied in a relatively small water-filter adapted to be attached directly to the supply-pipe and may be described in brief as comprising a T connection carrying a three-way cock communicating with the cylindrical filter-chamber, which is open at the bottom. The filter-tube is readily inserted within the chamber from below, said tube being mounted upon a supporting-base having a flexible packing-ring of peculiar form adapted to fit within the open mouth of said filter-chamber and engage its inner walls when the tube is secured in position by means of its readily-released supporting-button. The packing-ring is so constructed that under the influence of fluid-pressure within the chamber said ring is flexed into closer and closer engagement with the lower inner wall of the filter-chamber and with its support as well, so that a highly-efficient joint is formed which admits of the easiest removal and insertion of the filtering medium.

My said invention may be more readily explained and understood by making reference to the accompanying drawings of said filter, wherein—

Figure 1 is a view in elevation of the upper portion of the filter, the lower portion thereof being broken away. Fig. 2 is a vertical sectional view of the complete device on a slightly-reduced scale. Fig. 3 is a detailed view, in vertical section, of the upper portions. Fig. 4 is a similar view of the lower portions; and Fig. 5, a top view of the filter, showing the central part in horizontal section.

Like parts have throughout said figures been indicated by the same character of reference.

A cylindrical casing $a$, open and slightly flaring interiorly at the bottom and carrying at the top a chambered cap $a^x$, forms the filter-chamber wherein the filter-tube $b$, of Tripoli stone or other suitable material, is carried upon its mounting or base portion $c$. Attached at one side of the filter-chamber is a T connection $d$, mounting a rotatable three-way cock $e$, its upper end having a threaded half-hose connection $d'$ for attachment to the supply-pipe, while within the mouth or faucet-opening $d^2$ at the lower end of said T connection is a netting or strainer $d^3$. Said cock is adapted, as will readily be seen, alternatively to cut off the flow of water from the water-supply pipe, to permit its direct flow through the T connection and its faucet-opening $d^2$, or to divert the passage of the water through the filter-chamber and the filtering medium. The base portion $c$ is secured to the filter-tube by means of a central rod $b'$, threaded at either end, which screws into the head $f$ and a lug $c'$ upon the former, fluid-tight connection between these parts being secured by means of flat rubber washers $c''$, interposed between the filter-tube and its mountings. The head $f$ is provided with a button $f'$, laterally cut away and adapted to be inserted within the slot $a'$, cut beneath the cap $a^x$, surmounting the filter-chamber. By rotating the filter-tube one-quarter turn when the supporting-button is inserted within the slot it will be seen that said tube may normally be securely mounted within the filter-chamber, although very readily removable therefrom.

Loosely mounted upon the base portion $c$ is the packing-ring $g$, formed of rubber or other suitable material, which with the said base portion of the filter-tube mounting forms an effective closure for the filter-chamber, the mouth of which is completely filled thereby. The base portion has a central raised boss $c^2$ and an encircling annular bed $c^3$ for the accommodation of the packing-ring. Said packing-ring or closure part $g$ is of peculiar form the better to insure an effective fluid-tight joint between the filter parts. Normally this annulus of rubber when seen in cross-section is somewhat convex upon its lower face $g^2$, while its side walls are outwardly flaring to form a continuous thin edge or lip $g'$ along its upper circumference. These features for the purposes of illustration are slightly exaggerated in Fig. 2. Upon the access of pressure to the filter-chamber, however, the packing-ring is flexed, so that the annular portion $c^3$ of the supporting-base is engaged by the lower face of the packing-ring and the inner walls of the mouth of the filter-chamber are close pressed by the resilient lip or edge $g'$, said ring, as it were, rocking upon its convex face into close engagement with the two separable filter parts. The effectiveness of this joint is merely increased by any additional pressure within the chamber and the water must perforce seek passage to the external air through the filter-tube $b$ and the ducts $c^4$ $c^5$, provided in the supporting-base.

In Fig. 2 the packing-ring is shown in its normal position, the cock being turned to afford an unrestricted flow of unfiltered water from the faucet-opening in the T connection.

Fig. 4 shows the cock turned to admit water under pressure to the filter-chamber, the packing-ring or closure part being flexed into close engagement with the mouth of the filter-chamber and with the base $c$.

When it is necessary or desirable to clean the filter, the cock is given one-half turn from the position shown in Fig. 4, thus cutting off the water-supply, and the filter-tube and mountings are turned on their axis one-quarter around, thereby releasing the supporting-button $f'$ from its engaging position within the cap, (see Fig. 3,) whereupon the filter-tube and its connected parts may very readily be slipped down and out of the filter-chamber. The accumulated sediment and deposit may at once and most conveniently be washed therefrom by opening the cock, as shown in Fig. 2, permitting the water to flow from the faucet-opening over the detached filter-tube and its mounting held beneath the same, any remaining impurities being scraped or rubbed from the filter-tube, whereupon it may be returned to place within the filter-chamber. This provides practically all the advantages of a self-flushing filter, since the steps outlined need take but a few moments' time, and the filter meanwhile is inspected and its cleanliness ascertained. The filter affords no opportunity for the collection of filth and germs therein.

It will at once be appreciated that the described construction is simple and cheap and avoids the disadvantages already referred to herein. Filters or other fluid-chambers equipped with the closure device shown will be found to have a highly-efficient fluid-tight joint, permitting the easiest and promptest separation and reconnection of the respective parts.

The details herein set forth will admit of modifications without departing from the spirit of my invention, since I have shown but a single structure embodying the simplest expression of the same.

I accordingly claim as new and desire to secure by Letters Patent the following:

1. In combination in a filter device, the casing forming the receiving-chamber, the removable closure or base portion, the filtering medium removably mounted in the chamber, and the flexible packing-ring or closure part having exteriorly-flaring side walls terminating in a thin edge or rim, adapted to engage the inner walls of the casing and the base portion, a convex bearing-face being provided and serving to mount the packing-ring upon the base portion, whereby under pressure the packing-ring is rocked to form a fluid-tight joint between the separable parts, substantially as set forth.

2. In combination, the casing forming a fluid-chamber, of the removable base portion or closure therefor, and the flexible packing-ring mounted therebetween; the same having a convex lower face and flaring side walls adapted respectively to engage said base portion and the inner walls of the fluid-chamber and to be flexed under pressure within the chamber, into closer engagement therewith to form a fluid-tight joint, substantially as set forth.

3. In a filtering device, the combination with the tubular filter-chamber having an open mouth for the insertion of the filtering medium, of a filter-tube and its mounting adapted to be slipped into and out of said chamber, and a flexible packing-ring or closure part having a convex lower face and flaring side walls adapted respectively to engage the mounting of the filter-tube and the inner walls of the mouth of said filter-chamber, whereby a fluid-tight joint is formed between the removable filter parts upon the access of pressure to said filter-chamber, substantially as set forth.

Signed at Cleveland this 30th day of June, 1902, in the presence of two subscribing witnesses.

EZRA W. HASENPFLUG.

Witnesses:
CHARLES S. BEARDSLEY,
ALBERT LYNN LAWRENCE.